United States Patent [19]
Lo

[11] Patent Number: 5,363,584
[45] Date of Patent: Nov. 15, 1994

[54] SLINGSHOT FOR USE IN SHOOTING FISH LINE

[76] Inventor: Hsin-Hsin Lo, 9, Alley 3, Lane 35, Weitao Rd., N. Dis. Taichung, Taiwan, Prov. of China

[21] Appl. No.: 35,067

[22] Filed: Mar. 22, 1993

[51] Int. Cl.⁵ .............................................. A01K 91/02
[52] U.S. Cl. ......................................... 43/19; 124/20.1
[58] Field of Search ........................ 43/19, 21.2, 25; 124/17, 16, 20.1

[56] References Cited

U.S. PATENT DOCUMENTS

| | | | |
|---|---|---|---|
| 2,529,901 | 11/1950 | Behrens | 124/17 |
| 2,600,524 | 6/1952 | Fernsel | 124/16 |
| 2,823,483 | 2/1958 | Malott | 43/19 |
| 3,559,328 | 2/1971 | Lesher | 43/19 |
| 3,683,882 | 8/1972 | Braxton | 43/19 |
| 4,014,126 | 3/1977 | Samuels et al. | 43/19 |
| 4,127,956 | 12/1978 | Hertkorn | 43/19 |
| 4,805,583 | 2/1989 | Mosser | 124/17 |

Primary Examiner—P. Austin Bradley
Assistant Examiner—Chuck Y. Mah
Attorney, Agent, or Firm—Larson and Taylor

[57] ABSTRACT

A slingshot for use in shooting a fish line comprises a Y-shaped body having two arms, each of which is provided with a safety pin and an upper tip to which an end of an elastic band is fastened. The elastic band is provided at the midpoint thereof with a leather piece attached firmed, thereto. The Y-shaped body further has a bottom end fastened to a fastener which is in turn fastened to a fishing rod. The bottom end of the Y-shaped body is fastened to the fastener in a manner that the Y-shaped body can be so adjusted as to be placed in a position perpendicular to the fishing rod or in a position in which the Y-shaped body rests on the fishing rod. With the slingshot, an angler is able to hurl out a fish line, along with a fishhook, a sinker and a float, to hit an intended area of the water surface.

1 Claim, 3 Drawing Sheets

SLINGSHOT FOR USE IN SHOOTING FISH LINE

BACKGROUND OF THE INVENTION

The present invention relates to a slingshot enabling an angler to shoot a fish line, along with a fishhook, a sinker and a float, to hit an intended area of the water surface with precision and speed.

To most people, fishing is an indispensable amusement. However, the anglers often become annoyed at and irritated by an incident in which a fishhook of the prior art fishing tackle is hurled out and ends up hitting and catching the unintended targets, such as clothes or fish lines of the nearby fellow anglers, twigs of a tree under which they are fishing, and other nearby objects, Such an incident can often spoil the fun and the joy of fishing.

SUMMARY OF THE INVENTION

It is, therefore, the primary objective of the present invention to provide a slingshot which enables an angler to shoot a fish line, along with a fishhook, a sinker and a float, in a manner that the fish line is hurled out to hit an intended area of the water surface.

In keeping with the principle of the present invention, the foregoing objective of the present invention is attained by a Y-shaped slingshot, which comprises an elastic band with both ends thereof attached respectively to the upper tips of two arms of the Y-shaped slingshot, A leather piece is attached firmly to the midpoint of the elastic band. Located respectively at the inner sides of the two arms of the slingshot is a safety pin for use in supporting a fishhook. In the process of shooting the fish line, an angler uses one band to hold securely the lower portion of the slingshot, which is fastened to a fishing rod, and another band to hold the leather piece containing therein the sinker so as to stretch the elastic band in a direction toward the angler. By releasing the stretched elastic band, the angler is able to make use of the elastic force of the elastic band to hurl out the sinker, along with the fish line, the fishhook and the float, to hit a target area of the water surface. The foregoing objective and features of the present invention can be more readily understood upon a thoughtful deliberation of the following detailed description of a preferred embodiment of the present invention, in conjunction with the accompanying drawings.

DETAILED DESCRIPTION OF THE PREFERRED EMBODIMENT

Figure 1:
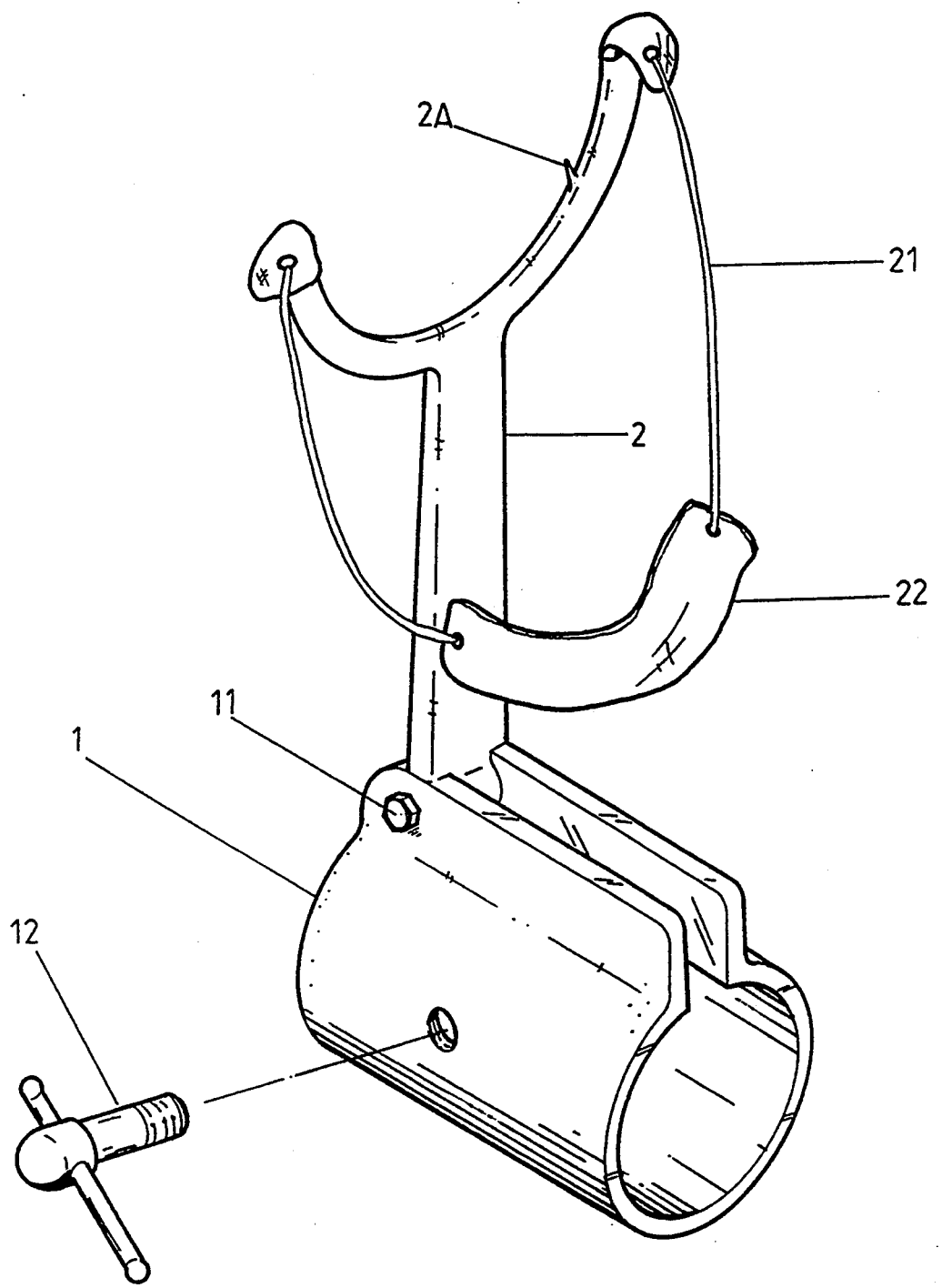
FIG. 1 shows a perspective view of the slingshot of the present invention.
Figures 2, 3:
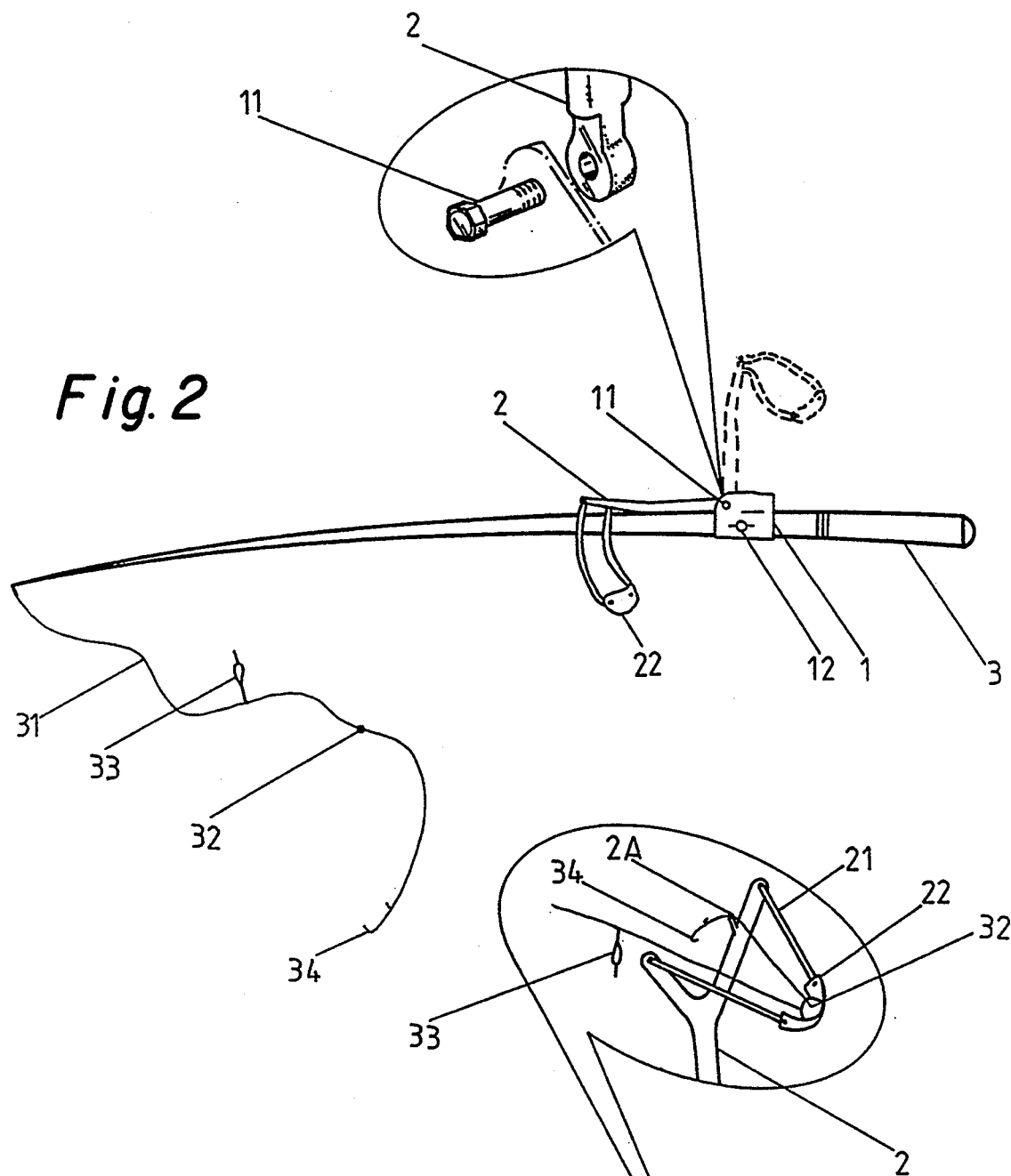
FIG. 2 shows a schematic view of the slingshot of the present invention, fastened to a fishing rod.
FIG. 3 shows a schematic view of the present invention in use.
Figure 4:
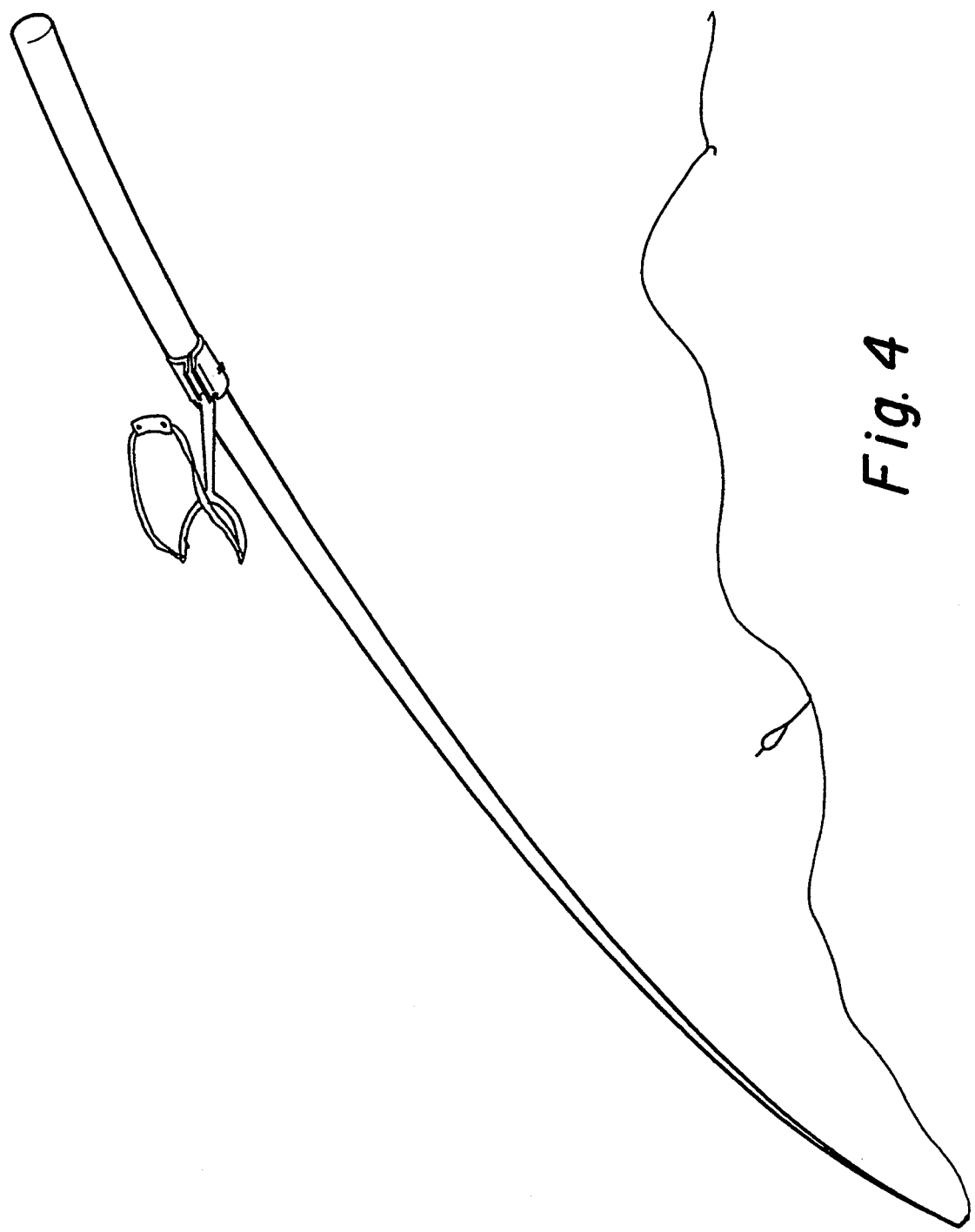
FIG. 4 shows a perspective view of fishing tackle with a slingshot of the present invention fastened thereto.

Referring to FIGS. 1 and 2, a slingshot of the present invention comprises a fastener 1, which is attached at one end thereof to a bottom end of a Y-shaped body 2 and at another end thereof to a fishing rod. The fastener 1 is attached to the main body 2 by means of a bolt 11 in such a way that the body 2 of the slingshot can be held in a position perpendicular to the fishing rod or pushed downwards to rest on the fishing rod, as shown in FIG. 2. Located respectively at the inner sides of the two arms of the Y-shaped body 2 is a safety fork 2A for use in supporting a fishhook. There is an elastic band 21 attached at both ends thereof to the upper tips of the two arms of the Y-shaped body 2. Attached to the midpoint of the elastic band 21 is a leather piece 22. The Y-shaped body 2 is fastened to the fishing rod 3 by means of the fastener 1 and a bolt 12.

The process of shooting a fish line 31 is illustrated in FIG. 3, in which the slingshot of the present invention is placed in a position normal to the fishing rod 3. A sinker 32 is contained in the leather piece 22 while a fishhook 34 is supported by the safety tip 2A. With one hand holding the lower portion of the Y-shaped body 2, an angler uses another hand to hold the leather piece 22 to stretch the elastic band 21 in a direction toward the angler. By aiming at an intended target area of the water surface and subsequently by releasing the stretched elastic band 21, the sinker 32 is hurled out along with the fish line 31, the fishhook 34 and a float 33, to hit the intended target area of the water surface. When the slingshot of the present invention is not in use, it can be pushed downwards to rest on the fishing rod 3, as shown in FIG. 2.

The present invention is ingeniously simple in structure and is suitable for use by either an experienced angler or a neophyte angler. Moreover, the present invention can be used at a crowded fishing site and at any fishing site regardless of its topographic features.

The embodiment of the present invention described above is to be regarded in all respects as merely illustrative and not restrictive. Accordingly, the present invention may be embodied in other specific forms without deviating from the spirit thereof.

The present invention is therefore to be limited only by the scope of the hereinafter appended claim.

What is claimed is:

1. A slingshot for use in shooting fish line comprising a Y-shaped body having first and second arms and a bottom end, a fastener for attaching said bottom end of said Y-shaped body to a fishing rod, said fastener including means which allow said Y-shaped body to be held in a position perpendicular to a fishing rod or pushed downward to rest on a fishing rod, an elastic band having first and second ends attached to said arms at upper ends thereof, respectively, and a safety fork positioned on an inner side of one of said arms for supporting a fish hook.

* * * * *